(12) United States Patent
Prouteau et al.

(10) Patent No.: US 7,310,939 B2
(45) Date of Patent: Dec. 25, 2007

(54) DEVICE FOR REDUCING THE JET NOISE OF A TURBOMACHINE

(75) Inventors: Jackie Prouteau, Villecresnes (FR); Frédéric Miroudot, Moissy-Cramayel (FR)

(73) Assignee: SNECMA, Paris (FR)

( * ) Notice: Subject to any disclaimer, the term of this patent is extended or adjusted under 35 U.S.C. 154(b) by 585 days.

(21) Appl. No.: 10/887,222

(22) Filed: Jul. 9, 2004

(65) Prior Publication Data

US 2005/0115245 A1 Jun. 2, 2005

(30) Foreign Application Priority Data

Jul. 9, 2003 (FR) .................................. 03 08383

(51) Int. Cl.
*F02K 1/46* (2006.01)
*F02K 1/48* (2006.01)

(52) U.S. Cl. .......................... 60/262; 60/264; 181/220; 239/265.17; 239/265.19

(58) Field of Classification Search .................. 60/262, 60/264; 181/213, 220; 239/265.17, 265.19
See application file for complete search history.

(56) References Cited

U.S. PATENT DOCUMENTS 3,161,257 A * 12/1964 Young ................... 239/265.19

| 3,568,792 | A | * | 3/1971 | Urquhart ................ 239/265.19 |
| 4,401,269 | A | | 8/1983 | Eiler |
| 4,576,002 | A | | 3/1986 | Mavrocostas |
| 6,082,635 | A | * | 7/2000 | Seiner et al. .......... 239/265.19 |
| 6,578,355 | B1 | * | 6/2003 | Mundt .......................... 60/262 |
| 6,606,854 | B1 | * | 8/2003 | Siefker et al. ................ 60/262 |
| 6,640,537 | B2 | * | 11/2003 | Tse .............................. 60/262 |
| 2002/0178711 | A1 | | 12/2002 | Martens |

FOREIGN PATENT DOCUMENTS

| EP | 1 160 439 A1 | 12/2001 |
| WO | WO 00/40851 A1 | 7/2000 |

* cited by examiner

*Primary Examiner*—Ted Kim
(74) *Attorney, Agent, or Firm*—Rothwell, Figg, Ernst & Manbeck, PC

(57) ABSTRACT

A device for reducing the jet noise of a turbomachine, the turbomachine having a longitudinal axis and a substantially cylindrical nozzle extending along the longitudinal axis of the turbomachine, having a downstream end for mixing the flows of gas inside and outside the nozzle, the device comprising a plurality of corrugations disposed to extend the downstream end of the nozzle, and a plurality of notches disposed between pairs of successive corrugations in the plurality of corrugations, and the plurality of corrugations and the plurality of notches are symmetrical relative to at least one axis perpendicular to the longitudinal axis of the turbomachine so as to generate a dual counter-rotating effect between the gas flows.

4 Claims, 3 Drawing Sheets

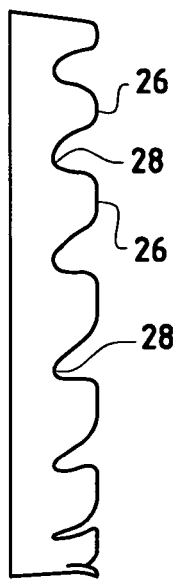 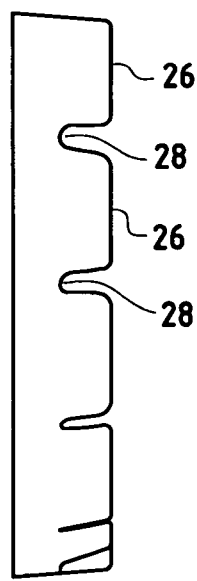 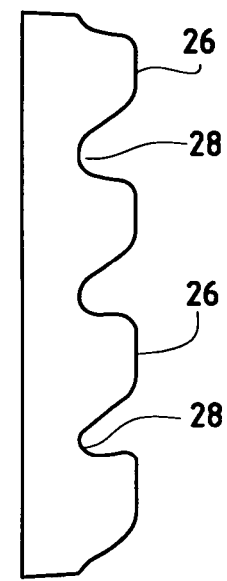
FIG.3A   FIG.3B   FIG.3C
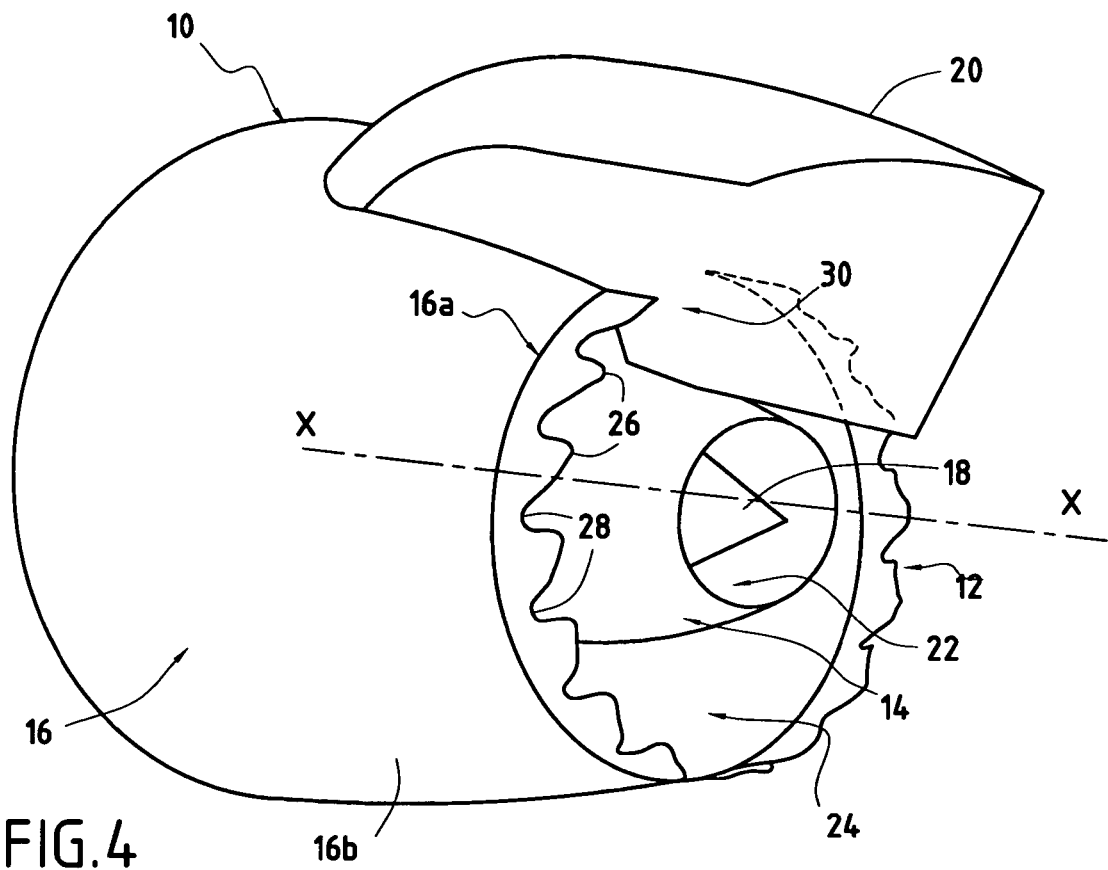
FIG.4

DEVICE FOR REDUCING THE JET NOISE OF A TURBOMACHINE

BACKGROUND OF THE INVENTION

The present invention relates to the general field of nozzles fitted to turbomachines. It relates more particularly to reducing the jet noise generated at the outlet from separated flow nozzles of airplane turbomachines, in particular while such airplanes are taking off.

The nozzles fitted to civil airplane turbomachines are generally made up of a central body surrounded by a primary cowl forming between them a first annular channel for a primary flow. A secondary cowl surrounds the primary cowl to form a second annular channel for a secondary flow. Overall such nozzle assemblies are generally axially-symmetrical in shape.

The present invention relates to a device for reducing the jet noise at the outlet from such nozzles, in particular during takeoff when the ejection speeds of the primary and secondary flows are transonic (i.e. about 0.9 Mach), but without thereby degrading aerodynamic performance.

In order to reduce the jet noise generated at the outlet from the nozzles, it is known to encourage mixing between the primary and secondary flows coming from the turbomachine. For example, proposals have been made to provide the primary cowl of the nozzle with lobes that enable radial shear to be obtained between the primary and secondary flows so as to encourage said flows to mix. However, that type of lobed nozzle has little effect on reducing jet noise and it is not suitable for flows at transonic speeds. The slopes of the lobes are too great for such speeds, thereby giving rise to flow separation which degrades the aerodynamic performance of the nozzle.

European patent No. 1 160 439 discloses providing the nozzle cowls with chevrons in order to encourage mixing between the primary and secondary flows. Although that does reduce jet noise, installing such chevrons also tends to degrade the aerodynamic performance of the nozzle.

OBJECT AND SUMMARY OF THE INVENTION

The present invention thus seeks to mitigate such drawbacks by proposing a device for a turbomachine nozzle that enables jet noise to be reduced considerably, in particular for flows at transonic speeds, but without thereby degrading the aerodynamic performance of the nozzle.

To this end, the present invention provides a device for reducing the jet noise of a turbomachine, said turbomachine having a longitudinal axis and a substantially cylindrical nozzle extending along said longitudinal axis of the turbomachine, having a downstream end for mixing the flows of gas inside and outside said nozzle, said device comprising a plurality of corrugations disposed to extend the downstream end of the nozzle, and a plurality of notches disposed between pairs of successive corrugations in said plurality of corrugations, wherein said plurality of corrugations and said plurality of notches are symmetrical relative to at least one axis perpendicular to said longitudinal axis of the turbomachine so as to generate a dual counter-rotating effect between said gas flows.

The particular shape of the corrugations which are both twisted and three-dimensional, leads to a dual counter-rotating effect making it possible to increase mixing between the flows and thus to obtain an effective reduction in jet noise without degrading aerodynamic performance. This shape makes it possible to generate tangential shear between the flows in addition to the radial shear, thereby increasing mixing between the flows.

The present invention also provides a turbomachine nozzle comprising a primary cowl extending along a longitudinal axis of the nozzle, a central body disposed concentrically inside said primary cowl, and a secondary cowl concentrically surrounding the primary cowl, and in which the primary cowl and/or the secondary cowl includes a jet noise reduction device.

BRIEF DESCRIPTION OF THE DRAWINGS

Other characteristics and advantages of the present invention appear from the following description given with reference to the accompanying drawings which show an embodiment that has no limiting character. In the figures:

FIGS. 3A, 3B, and 3C are longitudinal section views of jet noise reduction devices constituting other variants of the invention; and FIG. 4 is a perspective view of a turbomachine nozzle fitted with a jet noise reduction device constituting a variant of the invention.

DETAILED DESCRIPTION OF AN EMBODIMENT

Figure 1A:
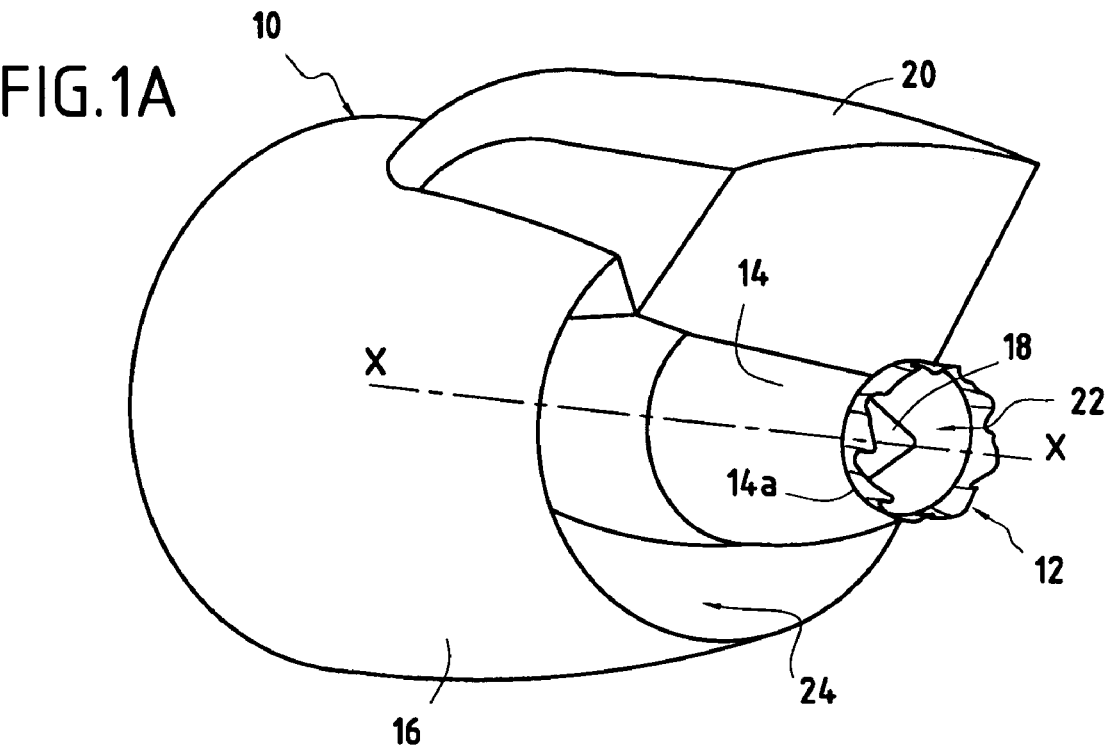
FIGS. 1A and 1B are perspective views of a jet noise reduction device of the invention fitted to a turbomachine nozzle.

FIG. 1A is a perspective view of a turbomachine nozzle 10 fitted with a jet noise reduction device 12 of the invention. The nozzle 10 is axially symmetrical in shape about a longitudinal axis X-X of the turbomachine, and is typically constituted by a primary cowl 14, a secondary cowl 16, and a central body 18. The primary cowl 14 is substantially cylindrical or frustoconical in shape, extending along the longitudinal axis X-X. The central body 18 is disposed concentrically inside the primary cowl 14 and is terminated by a portion that is substantially conical.

In FIG. 1, the downstream end 14a of the primary cowl 14 extends beyond the conical portion of the central body 18. The secondary cowl 16, which is likewise substantially cylindrical or frustoconical in shape, surrounds the primary cowl 14 concentrically. The nozzle as defined in this way is located beneath an airplane wing (not shown in the figures) by means of a support pylon 20.

The concentric assembly of the elements constituting the nozzle 10 serves to define: firstly between the primary cowl 14 and the central body 18, a first annular passage 22 for a gas flow coming from the turbomachine (referred to as the primary flow); and secondly between the primary and secondary cowls 14 and 16, a second annular passage 24 for the flow of air coming from the turbomachine (referred to as the secondary or "bypass" flow). The gas flows in these two annular passages 22 and 24 mix together at the downstream end 14a of the primary cowl 14.

It should be observed in FIG. 1A that the central body 18 of the nozzle 10 is of the internal type, i.e. the downstream end 14a of the primary cowl 14 extends longitudinally beyond the trailing edge of the central body. Nevertheless, the jet noise reduction device of the invention is equally applicable to an external type nozzle in which the trailing edge of the central body extends beyond the downstream end of the primary cowl.

Figure 1B:
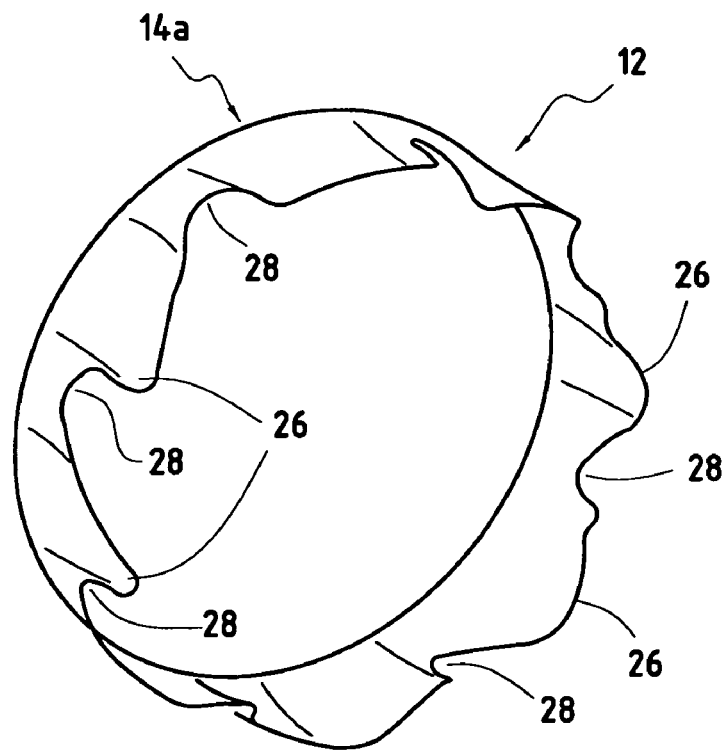

According to the invention, the nozzle 10 includes a jet noise reduction device 12 made up of a plurality of corrugations 26 extending from the downstream end 14a of the primary cowl 14 and a plurality of notches 28 plurality of corrugations so as to generate radial shear and tangential shear between the primary and secondary flows coming from the turbomachine (FIG. 1B).

The corrugations 26 formed at the downstream end 14a of the primary cowl 14 extend along the longitudinal axis X-X of the turbomachine. In the embodiment shown in FIG. 1B, each of them is twisted between its upstream end and its downstream end so as to extend radially inwards and outwards relative to the downstream end 14a of the primary cowl. The notches are in the form of nicks or cutouts extending substantially longitudinally between two successive corrugations 26.

The corrugations 26 and the notches 28 thus enable radial shear and tangential shear to be generated between the primary and secondary flows in order to increase mixing between the flows and thus reduce jet noise. Radial shear is used to mean shear that takes place in a radial direction relative to the substantially cylindrical shape of the primary cowl. Similarly, tangential shear means that the shear takes place in a direction that is tangential relative to the substantially cylindrical shape of the primary cowl.

Figure 2A:
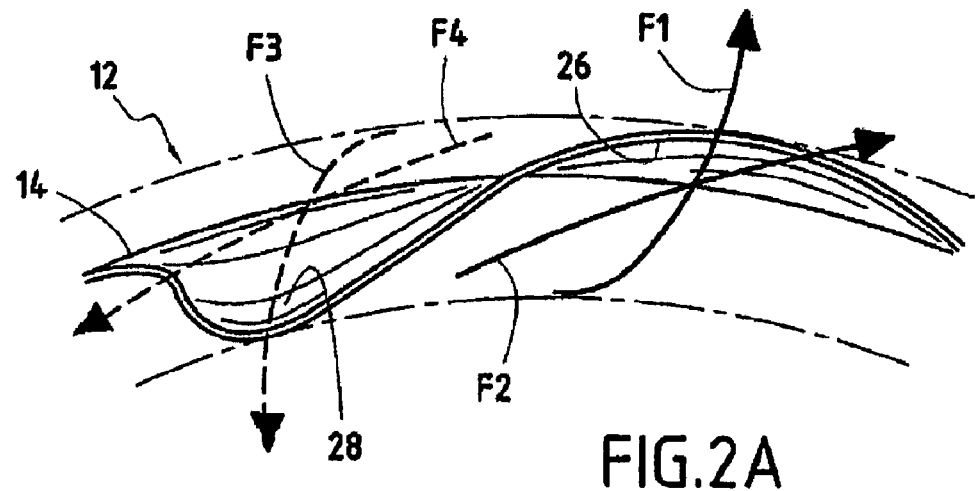
FIGS. 2A and 2B are views showing the shear effects and the dual counter-rotating effect generated by a jet noise reduction device of the invention.

FIG. 2A shows clearly this phenomenon of radial and tangential shear. In this figure, there can be seen a corrugation 26 and a notch 28 of the jet noise reduction device 12 of the invention applied to a primary cowl 14 of a nozzle. The continuous line arrows show the direction followed by the flow inside the device in the vicinity of the corrugation 26 and the notch 28, while the dashed-line arrows represent the direction followed by the flow outside the device in the vicinity of the same corrugation and notch.

At corrugation 26, the inside flow in the vicinity thereof is directed so as to mixed with the outside flow, both in a radial direction (arrow F1) and in a tangential direction (arrow F2). The radial and tangential direction (arrow F2). The radial and tangential directions of the inside flow are due to the fact that the corrugation is twisted radially outwards relative to the primary cowl 14.

Similarly, in each notch 28, the outside flow in the vicinity thereof is directed to be mixed with the inside flow both in a radial direction (F3) and in a tangential direction (F4). Thus, at the downstream end of the primary cowl between the inside and outside flows, radial shear occurs between the flows as represented by arrows F1 and F3, and tangential shear also occurs between the flows as represented by arrows F2 and F4.

According to an advantageous characteristic of the invention, the plurality of corrugations 26 and the plurality of notches 28 in the jet noise reduction device 12 are symmetrical relative to at least one axis perpendicular to the longitudinal axis X-X of the turbomachine so as to generate a dual counter-rotating effect between the inside and outside flows at the jet noise reduction device.

Figure 2B:
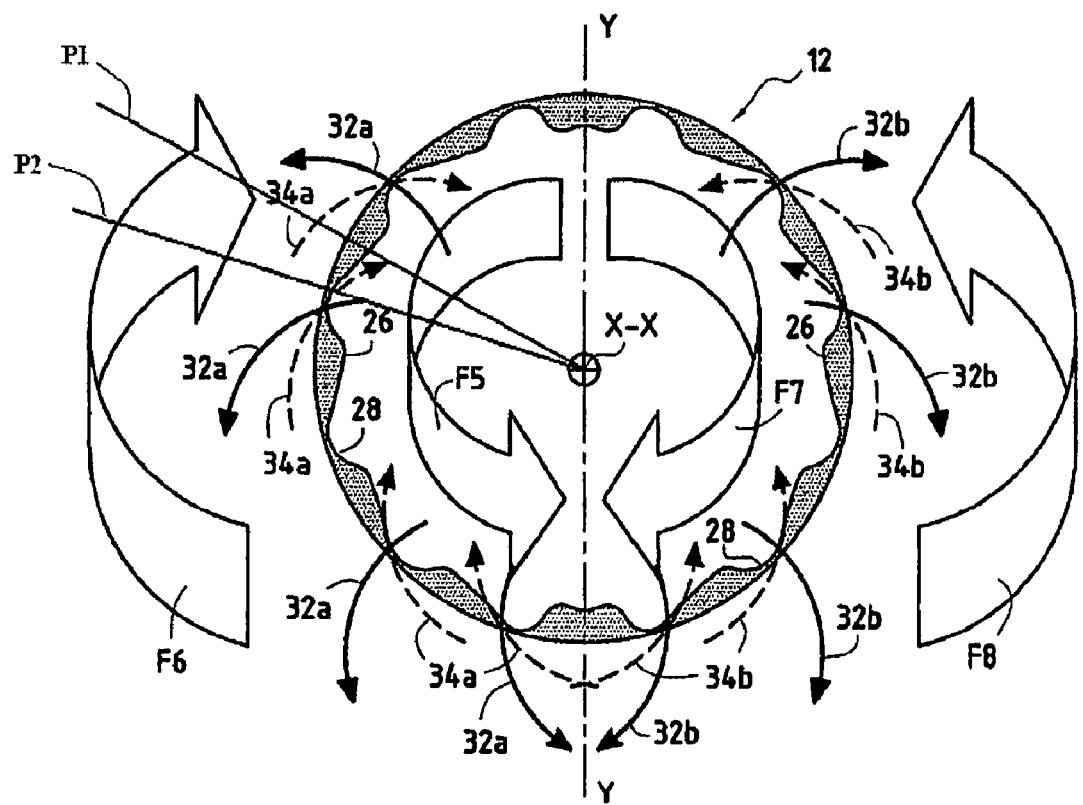

Thus, in FIG. 2B, the corrugations 26 and the notches 28 of the primary cowl are symmetrical relative to a transverse axis Y-Y. This symmetry causes a dual counter-rotating effect to be generated between the inside and outside flows.

As shown in FIG. 2B, each corrugation 26 is asymmetrical relative to a radial plane P1 that is median to the corrugation 26, and each notch 28 is asymmetrical relative to a radial plane P2 that is median to the notch 28.

Concerning the portion of the device 12 that is situated to the "left" of the transverse axis Y-Y, the inside flow mixes with the outside flow in the direction illustrated by arrows 32a. This mixing direction causes the inside flow to take on a general direction of rotation F5 that is counterclockwise. Similarly, the outside flow mixes with the inside flow in the direction represented by the arrows 34a. For the outside flow, this mixing direction leads to general rotation F6 in the clockwise direction. In this left-hand half of the jet.

Concerning the other half of the device, the inside flow mixes with the outside flow in the direction illustrated by arrows 32b. For the inside flow, this mixing direction leads to general rotation F7 in the clockwise direction. As for the outside flow, it mixes with the inside flow in the direction of arrow 34b. This mixing direction gives it general rotation F8 in the counterclockwise direction, i.e. in the opposite direction to the direction of rotation F7 of the inside flow. These opposite directions of rotation between the inside and outside flows in the second half of the jet noise reduction device 12 constitute a second counter-rotating effect.

Furthermore, it is possible to devise corrugations and notches for the jet noise reduction device presenting a plurality of symmetries relative to a plurality of axes perpendicular to the longitudinal axis X-X of the nozzle, so as to have a greater number of dual counter-rotating effects between the inside and outside flows.

In addition, the shape and number of the corrugations and the notches of the noise reduction device of the invention may be varied. In particular, the penetration depths of the corrugations into the inside and outside flows are not limited.

FIGS. 3A, 3B, and 3C are longitudinal sections showing other embodiments of the jet noise reduction device of the invention. In general, it should be observed that in order to avoid degrading aerodynamic performance, the corrugations 26 and the notches 28 of the jet noise reduction device of the invention need to have shapes that are gentle and rounded and they need to avoid penetrating too far into the inside and outside flows.

In FIG. 1A, the jet noise reduction device of the invention is applied to the primary cowl 14 of the nozzle 10. Nevertheless, it could be located elsewhere. Thus, In FIG. 1A, the jet noise reduction device of the invention is applied to the primary cowl 14 of the nozzle 10. Nevertheless, it could be located elsewhere. Thus, FIG. 4 shows a turbomachine nozzle 10 in which the secondary cowl 16 is provided at its downstream end 16a with a jet noise reduction device 12.

As in the application to the primary cowl, this device comprises a plurality of corrugations 26 disposed extending the downstream end 16a of the secondary cowl 16, and a plurality of notches 28 disposed between two successive corrugations. Nevertheless, it should be observed that provision is made to leave a gap 30 in the zone for fixing the pylon 20 to the secondary cowl, with there being no corrugations or notches in the gap 30 in order to make it possible to secure the pylon 20.

On the same principles as above, these corrugations 26 and notches 28 enable radial shear and tangential shear to be generated between the secondary flow of the turbomachine and the flow of air along the outside wall 16b of the secondary cowl 16 so as to increase mixing between these flows, thereby reducing jet noise.

Furthermore, in yet another variant application of the invention (not shown in the figures), a jet noise reduction device can be fitted both to the primary cowl and to the secondary cowl. Under such circumstances, these devices enable radial shear and tangential shear to be generated both between the primary flow and the secondary flow, and between the secondary flow and the flow of air along the outside wall of the secondary cowl.

What is claimed is:

1. A device for reducing the jet noise of a turbomachine, said turbomachine having a longitudinal axis (X-X) and a substantially cylindrical nozzle (10) extending along said longitudinal axis of the turbomachine, having a downstream end for mixing the flows of gas inside and outside said nozzle, said device comprising a plurality of corrugations (26) disposed to extend the downstream end of the nozzle, and a plurality of notches disposed between pairs of successive corrugations in said plurality of corrugations, wherein each corrugation is asymmetrical relative to a radial plane that is median to said corrugation and each notch is asymmetrical relative to a radial plane that is median to said notch and said plurality of corrugations and said plurality of notches are symmetrical relative to at least one axis perpendicular to said longitudinal axis of the turbomachine so as to generate a dual counter-rotating effect between said gas flows.

2. A turbomachine nozzle comprising:
- a primary cowl extending along a longitudinal axis of said nozzle;
- a central body disposed concentrically inside said primary cowl to define between said primary cowl and said central body a first annular channel for a primary flow; and
- a secondary cowl concentrically surrounding said primary cowl in order to define a second annular channel for a secondary flow,
- wherein said primary cowl includes a noise reduction device according to claim 1 at a downstream end thereof so as to generate radial shear and tangential shear between said primary and secondary flows.

3. A turbomachine nozzle comprising:
- a primary cowl extending along a longitudinal axis of said nozzle;
- a central body disposed concentrically inside said primary cowl to define between said primary cowl and said central body a first annular channel for a primary flow; and
- a secondary cowl concentrically surrounding said primary cowl in order to define a second annular channel for a secondary flow,
- wherein said secondary cowl includes a noise reduction device according to claim 1 at its downstream end so as to generate radial shear and tangential shear between said secondary flow and a flow of air flowing along the outside wall of said secondary cowl.

4. A turbomachine nozzle comprising:
- a primary cowl extending along a longitudinal axis of said nozzle;
- a central body disposed concentrically inside said primary cowl to define between said primary cowl and said central body a first annular channel for a primary flow; and
- a secondary cowl concentrically surrounding said primary cowl in order to define a second annular channel for a secondary flow,
- wherein each of said primary cowl and said secondary cowl comprises a respective noise reduction device according to claim 1 at a downstream end thereof so as to generate radial shear and tangential shear between said primary and secondary flows, and between said secondary flow and a flow of air flowing along an outside wall of said secondary cowl.

* * * * *